Figure 1:
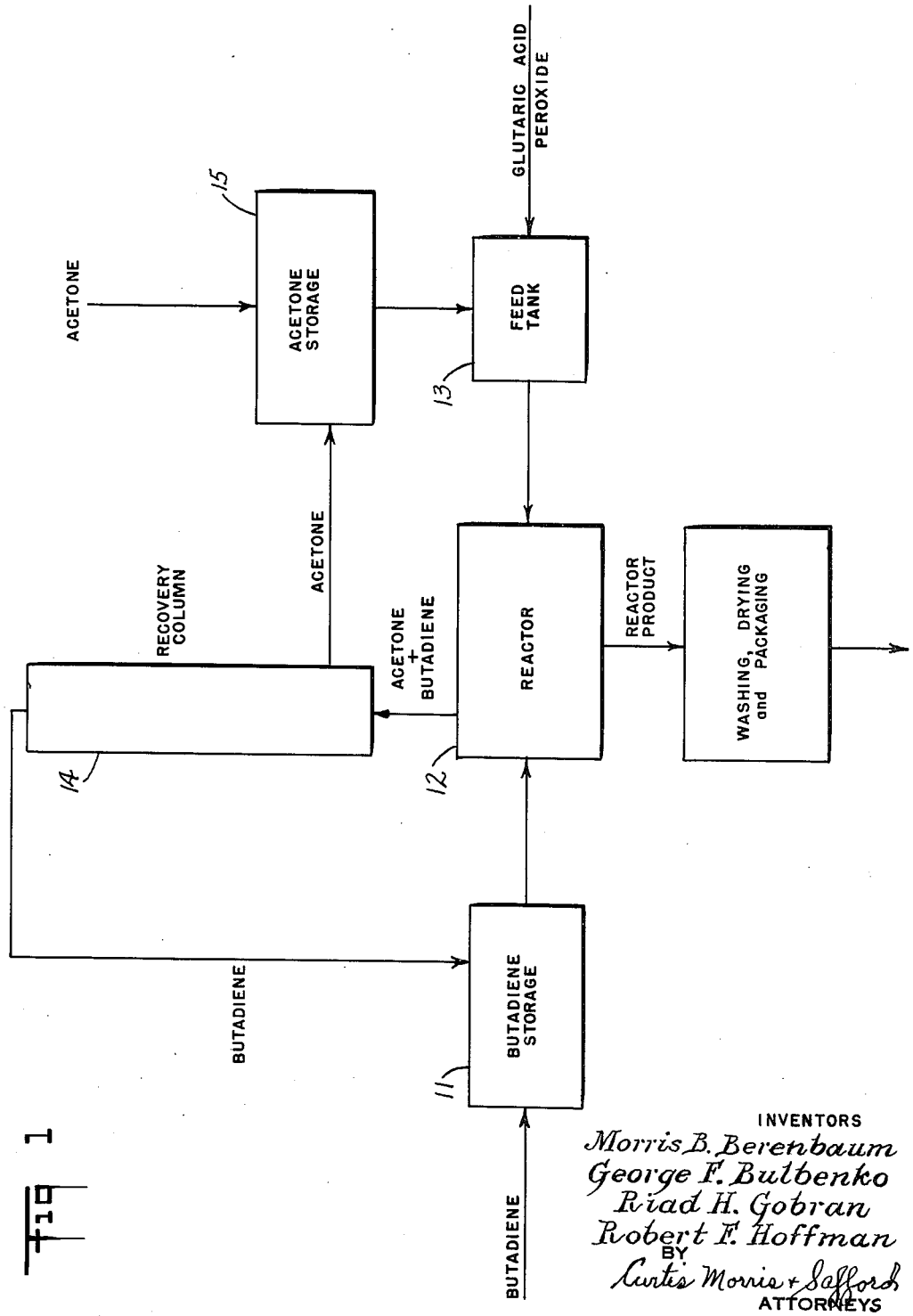

Feb. 15, 1966   M. B. BERENBAUM ETAL   3,235,589
LIQUID CARBOXY-TERMINATED POLYMERS AND PREPARATION
THEREOF WITH DICARBOXYLIC ACID PEROXIDES
Filed Sept. 25, 1961                                2 Sheets-Sheet 1

INVENTORS
Morris B. Berenbaum
George F. Bulbenko
Riad H. Gobran
Robert F. Hoffman
BY
Curtis Morris + Safford
ATTORNEYS United States Patent Office 3,235,589
Patented Feb. 15, 1966

3,235,589
LIQUID CARBOXY-TERMINATED POLYMERS
AND PREPARATION THEREOF WITH DICAR-
BOXYLIC ACID PEROXIDES
Morris B. Berenbaum, George F. Bulbenko, and Riad H.
Gobran, Levittown, Pa., and Robert F. Hoffman, River-
side, N.J., assignors to Thiokol Chemical Corporation,
Bristol, Pa., a corporation of Delaware
Filed Sept. 25, 1961, Ser. No. 140,585
10 Claims. (Cl. 260—533)

This invention relates to methods of making curable polymers and to such curable polymers.

In particular, the invention relates to methods of making curable addition polymers having unsaturations and reactive functional terminal groups and to such polymers.

The curable polymers of this invention are addition polymers of intermediate molecular weight and relatively narrow average molecular weight distribution. The polymers are unsaturated and are substantially 100 percent terminated by reactive carboxy groups. Properties of the polymers are substantially those of the long polymer chain, but the presence of unsaturations and, particularly, of reactive carboxy end terminals, permits further polymerization of the polymers by curing reactions. The intermediate molecular weight curable polymers of the invention are liquid materials, or are materials which may readily be fused at low temperatures. As such, they are in convenient form to be employed in impregnation, spraying, casting, and other techniques in which liquid or low molecular weight polymers are advantageously used. After impregnation or casting, for example, the materials may be readily cured to solid, difficultly fusible and insoluble high molecular weight polymer products.

An object of the present invention is the production of curable liquid or easily fusible polymers of a predetermined average molecular weight. Another object of the invention is the preparation of such polymers having substantially 100 percent of reactive carboxy terminals. Still another object of the invention is the manufacture of such polymers as a polymer product having a narrow average molecular weight distribution.

A feature of the invention is the polymerization of unsaturated monomers by a technique in which a polymerization initiator is added to the polymerization recipe in a variable, non-linear, continuous or incremental fashion during the course of the polymerization. Another feature of the invention is the use of certain di-acid peroxides as polymerization initiators.

According to the process of the present invention, highly efficient polymerizations, wherein reaction time is minimized, produce polymers having a narrow molecular weight distribution with average molecular weights in a range between 500 and 10,000, optimally between 1,500 and 5,000. The polymerizations proceed with a conversion and yield generally between about 40–50 percent to produce products whose viscosity is predictably selectable in a range between about 50 to about 2,000 or more poises. The polymer products have a relatively narrow molecular weight distribution in which at least 60–70 percent by weight of the product has a molecular weight within about ±50 percent of the average molecular weight, preferably within about ±33⅓ percent, as compared with conventional polymerization processes where much broader distributions are generally obtained.

The polymerization process of the present invention is particularly adaptable to the preparation of homopolymers of butadiene and isoprene, of copolymers of butadiene and isoprene in all proportions, and of copolymers of butadiene and/or isoprene with up to 35 percent by weight of acrylonitrile and/or styrene. The polymers may also contain up to 15 percent by weight of acrylic and/or methacrylic acids, which introduce carboxyl groups into the polymer other than at the terminals, or of esters, suitably alkyl esters, of acrylic and methacrylic acids.

The initiators employed in the process according to the present invention are dicarboxylic acid peroxides, suitably peroxides of those dicarboxylic acids which form internal (ring) anhydrides, from which the peroxides are most easily prepared. Use of these initiators leads to the formation of polymer products having substantially 100 percent carboxy terminals. The preferred initiators are glutaric acid peroxide, succinic acid peroxide, and alkyl-substituted glutaric and succinic acid peroxides such as, for example, methyl glutaric acid peroxide. These materials can be prepared by the method reported by Clover and Houghton, Amer. Chem. J. 32, 43–77 (1904), for example. Although other carboxy-terminated free radical producing initiating agents such as 4,4'-azobis-4-cyanopentanoic acid have been used in the process, the dicarboxylic acid peroxides, particularly glutaric acid peroxide, are much preferred. Thus, the viscosities of polymers prepared with the di-acid peroxides are considerably lower than are those of polymers of the same average molecular weight prepared with azo initiators. The more fluid products are much preferred for ease in handling, particularly in the curing process. Also, about 70 percent of the carboxy radicals derived from a di-acid peroxide liberate $CO_2$ before initiating polymerization to give carboxy-terminated polymer chains free of functional groups other than at the chain ends:

e.g.

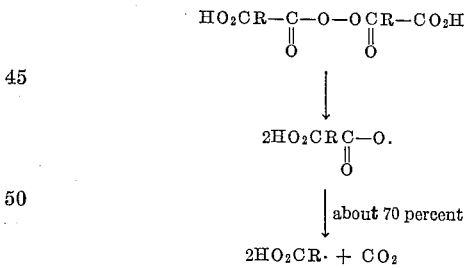

and $$HO_2CR \cdot + xM \rightarrow HO_2CR(M)_x \cdot$$

where M is a monomer. Finally, the cured products of the peroxide-initiated polymers have better low temperature properties (e.g. smaller loss of elongation on cooling), than do those prepared from azo-initiated polymers.

The dicarboxylic acid peroxides are most conveniently prepared by reaction of the corresponding dicarboxylic acid anhydrides with hydrogen peroxide. The reaction suitably takes place at a temperature below about 30° C., preferably about 10–20° C. in a period of two hours or less. The concentration of hydrogen peroxide in the reaction mixture is preferably at least 10 percent or higher, but the concentration of excess hydrogen peroxide is best kept less than about 25 percent of that required by stoichiometry.

The amount of initiator employed during the polymerization process is unusually high. For example, the total amount of initiator employed may be as much as 10–15 percent by weight of the monomer employed, whereas conventional polymerizations proceed in the presence of 1 to 2 percent of initiator.

The polymerizations of the invention are homogeneous, and may be either bulk or solution polymerizations in which the initiator is conveniently, and most usually, added as a solution in a suitable solvent. The quantity of solvent may be small as compared with the quantity of monomer, and may serve only as a vehicle for the initiator, rather than as a medium for the polymerization. The solvent is suitably a solvent for the monomer and the initiator, and is compatible with the system when polymer is also present so that the formation of a heterogeneous system is avoided, and should be inert to (i.e. non-reactive with) the polymerization mixture, but is otherwise not critical. Aliphatic, aromatic, and heterocyclic solvents are all suitable, with the above provisos, and oxygen-containing solvents such as acetone, dioxane, and tetrahydrofuran have been used with particular success with the di-acid peroxide initiators mentioned earlier.

The polymerization is carried out at temperatures of from about 60° C. to about 130° C., preferably from about 75° C. to 130° C., since the reaction may be slow at the lower temperatures. The reaction proceeds in pressure vessels under the autogenous pressure of the polymerizing system.

The degree of conversion increases non-linearly with time during the polymerization and, in batch systems, the point of conversion at which polymerization is terminated is usually determined by economic considerations.

These details of the invention can be seen to good advantage in FIGURE 1 of the drawings accompanying this application. FIGURE 1 shows a preferred embodiment of the process in which butadiene from storage tank 11 is introduced into reactor 12. A solution of glutaric acid peroxide initiator in acetone is also introduced into reactor 12 from feed tank 13 in a variable continuous or incremental (i.e. discontinuous) fashion during the course of the polymerization. After completion of the reaction, acetone and unreacted butadiene are passed to recovery column 14, from which butadiene is returned to storage vessel 11, and acetone is returned to storage vessel 15. The polymeric reactor product is then purified, as by washing and drying, and is packaged.

The introduction of the initiator into the reaction in a continuous or incremental non-linear fashion is critical to the production of a liquid polymer of the molecular weight within the limits earlier disclosed and having a narrow distribution of molecular weight, as earlier defined. Generally, the variable, non-linear addition of initiator involves the introduction of successively decreasing amounts of initiator with time, e.g. successively smaller "doses" if the addition is incremental or successive or continuous decreases in the initiator flow rate if the addition is continuous. It is evident that any of the foregoing modes of addition can be broadly characterized as addition of the initiator at a decreasing rate, and the phrase "decreasing rate" will be used herein to comprehend both continuous and discontinuous addition of the initiator. The variable non-linear addition of initiator is desirably such as to maintain a critical ratio of monomer concentration to the square root of the concentration of initiator.

The average degree of polymerization of the polymer in the system under discussion (and, hence, its molecular weight) can be expressed as:

(1) $$\overline{Pn} = f(T)\, MC^{-\frac{1}{2}}$$

where $\overline{Pn}$ = average degree of polymerization,
M = monomer concentration at a given time,
C = initiator concentration at a given time and $f(T)$ is a temperature dependent constant whose value is determined by the monomer and catalyst employed. Specifically, (2) $$f(T) = \frac{k_p}{(k_t k_d f)^{1/2}}$$

where $k_p$ = propagation constant of the monomer
$k_t$ = termination constant
$k_d$ = initiator decomposition constant, and
$f$ = initiator efficiency.

The temperature dependence of the constants $k_p$, $k_t$, and $k_d$ can be expressed by Arrhenius-type expressions:

$$k = \alpha \exp(-\beta/T)$$

where $\alpha$ and $\beta$ are constants, and can be determined empirically by measurements at two or more temperatures, as discussed in the paper "Bulk Polymerization of Isoprene: Kinetic Constants From the Dead-End Theory," by Gobran, Berenbaum, and Tobolsky, Journal of Polymer Science," vol. XLVI, pp. 431–440 (1960). This paper discloses the measurement of the temperature dependence of $k_d$ and of $k_p/(k_t f)^{\frac{1}{2}}$, and is incorporated herein by reference.

From Equation 1 it can be seen that a constant value of $\overline{Pn}$, at a given temperature, can be maintained by keeping the ratio $M/C^{\frac{1}{2}}$ constant.

In Table I below are given values of the ratio $M/C^{\frac{1}{2}}$ used to produce polymers of a given molecular weight (or $\overline{Pn}$) at various temperatures between 75° C. and 130° C. in the system butadiene-glutaric acid peroxide.

TABLE I

| MW | $\overline{Pn}$ | 75° | 85° | 95° | 105° | 115° | 120° | 125° | 130° |
|---|---|---|---|---|---|---|---|---|---|
| 500 | 6 | 9.2 | 10.1 | 11.4 | 13.4 | 16 | 19.3 | 21.1 | 24.0 |
| 1,500 | 24.5 | 37.6 | 41.3 | 46.6 | 54.9 | 65.3 | 78.8 | 86.1 | 98.3 |
| 4,000 | 70.7 | 108 | 119 | 134 | 157.8 | 188 | 227 | 248 | 282 |
| 5,000 | 89 | 136 | 150 | 169 | 199 | 237 | 286 | 312 | 356 |
| 10,000 | 182 | 279 | 306 | 346 | 407 | 485 | 536 | 640 | 728 |

Figure 2:
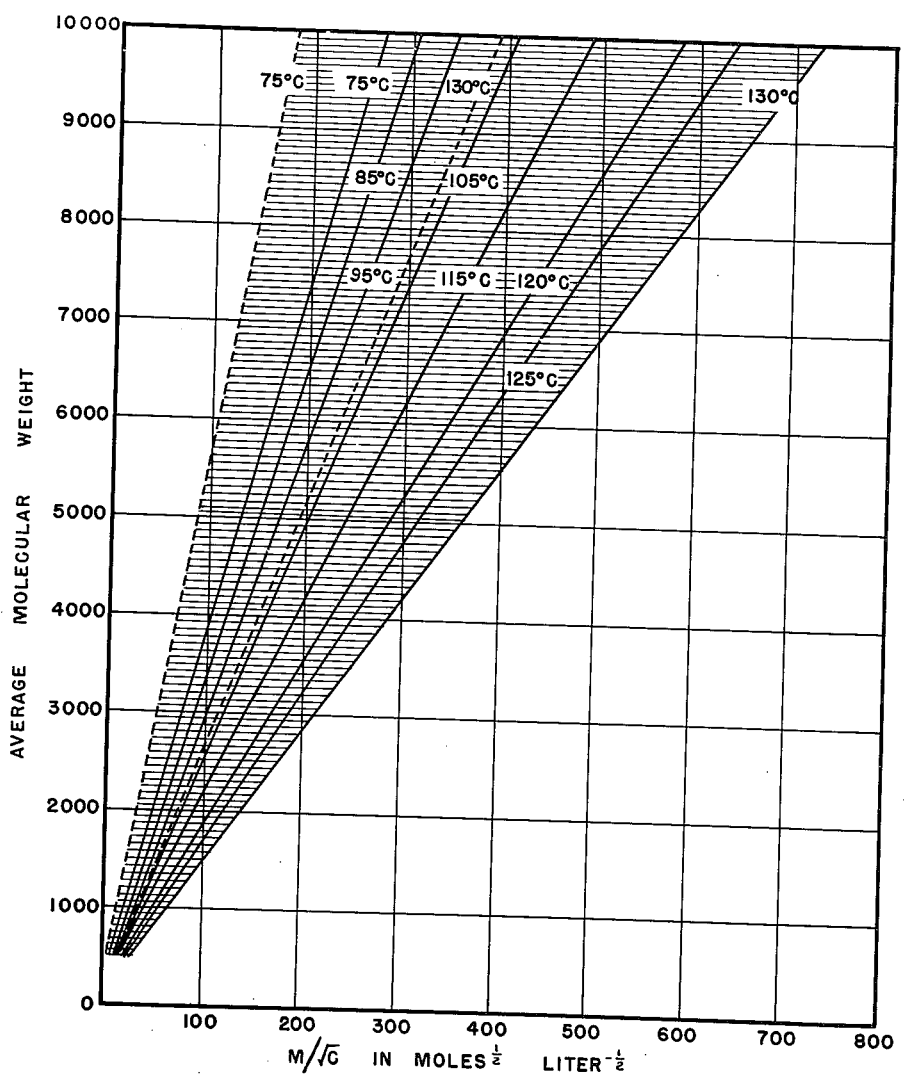

These data are also plotted in FIGURE 2 of the drawings, in which isothermal lines connect the points. Evidently, butadiene polymers of a molecular weight between 500 and 10,000 can be prepared, using glutaric acid peroxide as an initiator, between a temperature of about 75° and about 120° C., by maintaining the ratio $M/C^{\frac{1}{2}}$ at a value between 9.2 and 728 (moles/liter)$^{\frac{1}{2}}$.

Similar values of the ratio $M/C^{\frac{1}{2}}$ are given in Table II below for succinic acid peroxide at representative temperatures. These isotherms are indicated by broken lines in FIGURE 2.

TABLE II.—(SUCCINIC ACID PEROXIDE)

| MW | 75° | 130° |
|---|---|---|
| 500 | 6.0 | 13 |
| 1,500 | 24.6 | 53 |
| 4,000 | 70.7 | 150 |
| 5,000 | 89 | 190 |
| 10,000 | 182 | 390 |

The shaded area of FIGURE 2 includes those values of the ratio $M:\sqrt{C}$ at which carboxy terminated polybutadiene polymers of a pre-selected average molecular weight between about 500 and 10,000 can be prepared by polymerization of butadiene at temperatures between 75° C. and 130° C. in the presence of glutaric acid peroxide or succinic acid peroxide as an initiator.

To maintain the critical ratio $M/C^{1/2}$, the initiator, which decomposes with time, must be continually added to the system. However, since monomer is also disappearing as a result of polymerization, the amount of initiator required to maintain the ratio also decreases with time. It can be shown that the rate of addition of intiator follows the rigorous equation:

(3)
$$R(S-C) = C\left\{V_o[k_d(1-XF_o\Delta\rho) - F_o\Delta\rho\left(\frac{dX}{dt}\right) - 2K'C^{1/2}(1-XF_o\Delta\rho)] + [k_d - 2K'C^{1/2}]\int_o^t R\,dt\right\}$$

where:

$R$=rate of feed of initiator solution;
$S$=concentration of initiator solution;
$C$=initiator concentration in reactor;
$V_o$=initial volume of reactants in reactor;
$X$=fraction of monomer converted;
$F_o$=volume fraction of monomer in $V_o$;
$\Delta\rho$=(density of polymer)−(density of monomer);

$$K' = \frac{k_p(k_df)^{1/2}}{k_t^{1/2}}$$

$t$=time; and
$k_p$, $k_d$, $k_t$, and $f$ have their earlier meaning.

This relation can be rearranged for convenient computer programing, or can be simplified for hand calculation to:

(4)
$$R = \frac{V_{av}C}{S}[k_d - 2k'C^{1/2}]$$

where $V_{av}$=the average volume of the reactants in the reactor; and $C$, $S$, $k_d$, and $K'$ have their earlier significance.

Polymerizations carried out by addition of initiator according to a computer solution of Equation 3 or hand solutions of Equation 4 have given polymer products of a molecular weight extremely close to that predicted from Equation 1.

Although the continuous non-linear addition of initiator to the polymerization system is preferred as giving a product with narrowest molecular weight distribution, the initiator may also be added in discontinuous increments. As the number of increments added per unit time increases (and the size of each incremental addition decreases), the discontinuous addition more and more closely approximates continuous addition, giving products more like those obtained by continuous addition, particularly as concerns their molecular weight distribution.

Although the polymerization has been described as a batch process, in another embodiment of the invention the polymerization described is carried out in a continuous manner by continuously and proportionally feeding monomer or monomers into a reactor together with a solution of initiator dissolved in a solvent. The reactants are continuously agitated in a pressure reactor while heating at polymerization temperatures, and while continuously withdrawing product from the reaction vessel after an appropriate residence time. Unreacted monomer and solvent are removed from the product withdrawn, for example by distillation or evaporation techniques, and the remaining homopolymer or copolymer is washed until unreacted initiator and/or other impurities are removed. Finally, the polymer product is dried, for example under vacuum as in a falling film dryer.

As in the batch process earlier described, the proportions and feed rates of the monomeric and initiator ingredients are such as will maintain a substantially constant critical ratio of the monomer concentration to the square root of the initiator concentration, in view of the molecular weight of the polymer desired, and the temperature. To establish the initial critical ratio of monomer concentration to the square root of initiator concentration, the continuous polymerization proceeds from a batch recipe in which the critical ratio of monomer concentration to the square root of initiator concentration has already been established. In consequence, the continuous polymerization is suitably begun after the initial bulk addition of a certain quantity of monomer, together with a quantity of initiator sufficient to establish the critical ratio, as in the batch process, and is converted to continuous operation after a degree of conversion is reached which is suitable from an economic viewpoint.

When the process of the invention is used to polymerize conjugated diolefins such as butadiene, a substantially linear polymer formed by 1–4 addition results. As compared with other techniques, such as sodium or ionic polymerization of butadiene which may result in 50–75 percent of the butadiene monomer entering the polymer chain in a 1–2 addition and yielding a correspondingly large number of vinyl side groups, the free radical mechanism of the invention produces polybutadiene polymers containing only about 20 percent of butadiene monomer polymerized by 1–2 addition. The resulting polymers have a correspondingly low number of pendant vinyl groups attached to the main polymer chain.

It is believed that the absence of pendant groups in the final polymer composition prepared by free radical polymerization is responsible for the excellent low temperature properties of the polymer. For example, polybutadiene polymers prepared by free radical polymerization have a $G_{10,000}$ (the temperature at which the torsional modulus of a rod of one square inch cross section equals 10,000 pounds) of about −76° C., which is below the value found in polybutadiene polymers prepared with ionic catalysts. For low temperature work using these polymers, such a low value of $G_{10,000}$—which approximates the brittle point, $T_g$, of the polymer—is of considerable importance. Thus, the free radical polymerized polymers retain their flexibility at low temperatures and are particularly desirable for low temperature applications.

The carboxy terminated polymers of the invention are suitably cured with agents reactive with the carboxy group, such as polyepoxides, polyisocyanates, polyimines, polyamines, polyhydroxides, metal oxides and the like. Particularly good results have been obtained using tris-1-methylaziridinyl phosphine oxide as the curing agent.

A better understanding of the invention and of its many advantages can be obtained by reference to the following examples, given by way of illustration.

*Example 1.—Preparation of polybutadiene by non-linear continuous addition of glutaric acid peroxide*

A liquid carboxyl terminated polybutadiene polymer was prepared from 1,380 grams of butadiene monomer and 107.8 grams of glutaric acid peroxide (GAP) initiator as follows. All of the monomer was placed into a one-gallon autoclave previously purged with nitrogen and then with butadiene. The autoclave was next closed and heated to a reaction temperature of 95° C. This temperature was maintained during the polymerization. (The monomer vapor pressure at this temperature approximates 200 p.s.i.g.) Next, agitation was begun and an initial charge of initiator in solution, consisting of 8.3 grams of the GAP dissolved in 110 cc. of tetrahydrofuran (THF) solvent, was added to the monomer under pressure by means of a high pressure liquid metering device. After allowing the reaction temperature to stabilize (about 5 to 10 minutes when using the autoclave), a metered addition of initiator in solution, consisting of 99.5 grams of the GAP dissolved in approximately 625 cc. of the THF (a total volume of 690 cc.), was continuously fed at a non-linear rate to the polymerization over a period of 6.5 hours. The rate of addition of initiator feed solution was programmed so that at the end of arbitrarily selected time increments the following percentages of total volume had been continuously added to the polymerization: 0 hours, 0%; 2 hrs., 42.1%; 3 hrs., 58.1%; 4 hrs., 72.2%; 5 hrs., 84.3%; 6 hrs., 94.5%; and 6.5 hrs., 100%. (Pressure decreased during the reaction due to conversion of monomer to polymer, the latter having negligible vapor pressure.) Having achieved the desired conversion of monomer to crude polymer of 39.5% at the end of 6.5 hours, the addition of heat and initiator feed solution was stopped and cooling of the autoclave was begun. Upon cooling the reaction mixture to about 25° C., unreacted butadiene and THF were then distilled off from the mixture. The remaining polymer was washed with hot water until all the impurities and unreacted GAP were removed, and finally the polymer was dried under vacuum. The process yield (excluding reacted initiator) was 41.4%. The product was a liquid polymer having a Brookfield viscosity of 127 poises at 25° C., and a carboxyl content of 0.0628 equivalent per 100 g.

Similar techniques using GAP or other initiators disclosed herein can be used to prepare homopolymers of isoprene, using either a non-linear continuous feed of the initiator, or a non-linear incremental feed.

A polybutadiene polymer prepared as in Example 1 and having an average molecular weight of 3,636 was fractionated by a column elution fractionation using benzene as a solvent and isopropyl alcohol as a non-solvent. Nine fractions were obtained, the weight percent and molecular weight of each of which is given below in Table III.

TABLE III

| Fraction number | Number average molecular weight | Weight percent |
|---|---|---|
| 1 | 1,175 | 1.4 |
| 2 | 1,367 | 4.1 |
| 3 | 1,850 | 4.5 |
| 4 | 2,295 | 5.6 |
| 5 | 3,174 | 8.8 |
| 6 | 4,008 | 23.3 |
| 7 | 4,975 | 26.5 |
| 8 | 5,537 | 14.7 |
| 9 | 6,329 | 11.1 |

From the table it can be seen that about 70 percent of the polymer has an average molecular weight in the range between 1,850 and 4,975, or within ±50 percent of the average molecular weight, and that about 60 percent of the polymer has an average molecular weight within about ±33⅓ percent of the overall average molecular weight.

*Example 2.—Preparation of polybutadiene by non-linear continuous addition of succinic acid peroxide*

A liquid carboxyl terminated polybutadiene polymer was prepared from 102 pounds of butadiene monomer and 9.04 pounds of succinic acid peroxide (SAP) initiator as in Example 1 at a temperature of 95°. The initial initiator charge consisted of 0.80 pound of SAP dissolved in 9.31 liters of tetrahydrofuran (THF). The feed solution consisted of 9.04 pounds of SAP dissolved in 50 liters of THF. The feed solution was added in a non-linear rate over a total of 13 hours according to the following rate schedule.

FEED SCHEDULE

| Time (hours) | Rate (l./hr.) | Total feed (l.) |
|---|---|---|
| 0 | 7.63 | 0.00 |
| 1 | 6.58 | 7.08 |
| 2 | 5.75 | 13.24 |
| 3 | 5.07 | 18.64 |
| 4 | 4.63 | 22.27 |
| 5 | 4.02 | 27.66 |
| 6 | 3.61 | 31.47 |
| 7 | 3.26 | 34.90 |
| 8 | 2.96 | 38.01 |
| 9 | 2.70 | 40.84 |
| 10 | 2.48 | 43.43 |
| 11 | 2.27 | 45.80 |
| 12 | 2.10 | 47.99 |
| 13 | 1.94 | 50.00 |

Hydroquinone was added to the reactor after completion of addition of the feed solution to stabilize the polymer product. Similarly, about 5 percent by weight of phenyl β-naphthylamine was added as an antioxidant in the first washing of the product. The product comprised 23.25 pounds of a polymer having a viscosity at 25° C. of 795 poises, and a carboxyl content of 0.0348 equivalent per 100 grams.

*Example 3.—Preparation of polybutadiene by non-linear continuous addition of 4,4'-azobis-4-cyanopentanoic acid*

A liquid carboxyl terminated polybutadiene polymer was prepared from 1,380 grams of butadiene and 144.1 grams of 4,4'-azobis-4-cyanopentanoic acid (ABCPA) initiator using a continuous initiator feed and other procedures similar to those of Example 1. An initiator in solution was first prepared by dissolving all of the ABCPA in approximately 1,026 cc. of acetone and 37 cc. of water or a total volume of 1,143 cc. All of the butadiene was placed in the autoclave and heated to approximately 110° C. An initial charge of 32.2 cc. of initiator in solution was next added to the monomer under pressure. The reaction temperature was then raised to 120° C. and maintained thereat for the duration of polymerization. (Monomer vapor pressure at this temperature approximates 320 p.s.i.g.) After the autoclave temperature became stabilized, a variable metered addition of 1,110.8 cc. of initiator in solution was continuously fed to the polymerization vessel at 0.1 hour intervals over a period of 2.4 hours. The percentage of solution having been fed to the reactor by the end of each time interval was as follows:

| Hours | Percent fed | Hours | Percent fed | Hours | Percent fed | Hours | Percent fed | Hours | Percent fed |
|---|---|---|---|---|---|---|---|---|---|
| 0 | 0 | 0.5 | 25.2 | 1.0 | 48.0 | 1.5 | 68.2 | 2.0 | 86.6 |
| 0.1 | 5.2 | 0.6 | 30.0 | 1.1 | 52.5 | 1.6 | 72.3 | 2.1 | 90.3 |
| 0.2 | 10.2 | 0.7 | 34.6 | 1.2 | 56.6 | 1.7 | 75.9 | 2.2 | 93.4 |
| 0.3 | 15.6 | 0.8 | 39.4 | 1.3 | 60.6 | 1.8 | 79.5 | 2.3 | 96.6 |
| 0.4 | 20.5 | 0.9 | 44.0 | 1.4 | 64.6 | 1.9 | 83.1 | 2.4 | 100.0 |

The conversion of monomer to crude polymer was 57.1% at the end of the 2.4 hours. The polymer was recovered as in Example 1. Process yield was 50.1%. The product was a liquid polymer having a Brookfield viscosity of 417 poises at 25° C., and a carboxyl content of 0.06795 equivalent per 100 g.

The superiority of the peroxide initiators to azo initiators is shown below in Table IV where the viscosities of carboxy terminated polymers of the same molecular weight but prepared with different initiators are compared.

TABLE IV

| Molecular weight | Viscosity, poises | |
|---|---|---|
| | Azo (ABCPA) | Peroxide (GAP) |
| 3,000 | 300 | 120 |
| 4,000 | 750 | 220 |
| 5,000 | 1,500 | 380 |

The values show that for the same molecular weight polymer, a polymer initiated with GAP has a surprisingly lower viscosity than the corresponding polymer initiated with ABCPA.

*Example 4.—Preparation of polybutadiene by non-linear incremental addition of glutaric acid peroxide*

A liquid polymer was prepared as follows from 160 lbs. of butadiene and 3,650 grams (87.5% assay) of glutaric acid peroxide (GAP) using a non-linear incremental initiator feed. A 50-gallon reactor was first vacuum-purged and an initial charge of initiator in solution, consisting of 150 grams of the GAP dissolved in 4.2 liters of tetrahydrofuran (THF), and all of the butadiene were placed therein. The reactor was then closed and heated to, and maintained at, 95° C. A variable metered addition of initiator in solution, consisting of 3,500 grams of the GAP dissolved in approximately 19.5 liters of the THF (a total volume of 23.5 liters) was fed incrementally to the reaction during the first eleven hours of a twelve hour polymerization period. Non-linear percentage of solution fed at the beginning of arbitrarily selected time intervals was as follows:

| Hours | Percent fed | Hours | Percent fed | Hours | Percent fed | Hours | Percent fed |
|---|---|---|---|---|---|---|---|
| 0 | 0 | 3 | 34.0 | 6 | 62.2 | 9 | 84.3 |
| 1 | 11.9 | 4 | 43.9 | 7 | 70.3 | 10 | 90.3 |
| 2 | 23.0 | 5 | 53.6 | 8 | 77.5 | 11 | 100 |
| | | | | | | 12 (End of reaction time) | |

The reaction mixture was next cooled and a free radical inhibitor (hydroquinone) added, excess butadiene was vented from the reactor, and excess solvent was vacuum distilled from the mixture. The remaining polymer was washed with hot water until all of the impurities and unreacted GAP were removed, an antioxidant (1% PBNA=phenyl beta naphthyl amine) was added and, finally, the polymer was dried under vacuum. The process yield (excluding reacted initiator) was 40.4%. The product was a liquid polymer having a Brookfield viscosity of 200 poises at 25° C. and a carboxyl content of 0.0578 equivalent per 100 g. Samples were taken and analyzed as in Example 1. The polymer average molecular weight distribution was somewhat less narrow than polymers prepared by continuous feed. Uniformity can be improved by selecting a greater number of time increments during the polymerization and adjusting the feed rate correspondingly.

*Example 5.—Butadiene-isoprene copolymer prepared by continuous initiator feed*

A carboxy terminated liquid polymer butadiene-isoprene copolymer having a viscosity at 25° C. of 703 poises and a carboxyl content of 0.0385 equivalent/100 gms. was prepared by a continuous initiator feed process similar to that in Examples 1–3. The monomer charge comprised 2.28 lbs. of butadiene and 0.957 lb. of isoprene. A total of 0.195 lb. of GAP was employed, of which 0.0123 lb. were employed as an initial charge dissolved in 0.70 liter of acetone. The reaction temperature was 95° C. The remaining 0.182 lb. of GAP was added in a feed solution dissolved in 0.451 liter of acetone. The feed schedule was as follows:

FEED SCHEDULE

| Hours | Rate of feed, liters per hr. | Total liters fed |
|---|---|---|
| 0 | .093 | 0 |
| 0.5 | .085 | .0445 |
| 1 | .078 | .0855 |
| 1.5 | .0722 | .123 |
| 2 | .067 | .158 |
| 2.5 | .062 | .190 |
| 3 | .058 | .220 |
| 3.5 | .054 | .248 |
| 4 | .050 | .274 |
| 4.5 | .047 | .300 |
| 5 | .045 | .322 |
| 5.5 | .042 | .344 |
| 6 | .040 | .364 |
| 6.5 | .037 | .384 |
| 7 | .035 | .402 |
| 7.5 | .034 | .420 |
| 8 | .032 | .435 |
| 8.5 | .030 | .451 |

One percent of phenyl-$\beta$-naphthylamine was added before washing the polymer.

*Example 6.—Preparation of butadiene-styrene copolymer by non-linear continuous addition of glutaric acid peroxide*

A carboxyl terminated liquid polybutadiene-styrene copolymer was prepared from 2.73 lbs. of butadiene, 0.586 lb. of styrene, and 0.2678 lb. of GAP at 95° C. in a technique like that used in Example 1. The initial initiator charge comprised 0.0438 lb. of GAP dissolved in 0.152 liter of acetone. The remaining 0.224 lb. of GAP was added continuously over 4 hours in a feed solution with 0.579 liter of acetone, according to the following feed schedule:

FEED SCHEDULE

| Hours | Rate of feed, liters per hour | Total liters fed |
|---|---|---|
| 0 | 0.2794 | 0 |
| 0.5 | 0.2228 | 0.1255 |
| 1 | 0.1834 | 0.2271 |
| 1.5 | 0.1533 | 0.3113 |
| 2 | 0.1300 | 0.3821 |
| 2.5 | 0.1114 | 0.4425 |
| 3 | 0.0966 | 0.4945 |
| 3.5 | 0.0844 | 0.5397 |
| 4 | 0.0744 | 0.5795 |

0.99 lb. of polymer having a viscosity at 25° C. of 302 poises and a carboxyl content of 0.0626 equivalent/100 gms. was obtained.

*Example 7.—Preparation of polybutadiene-acrylonitrile copolymer by non-linear continuous addition of glutaric acid peroxide*

A liquid carboxyl terminated polybutadiene-acrylonitrile polymer was prepared in a manner similar to that in Example 1 from 103.6 lbs. of butadiene, 15.5 lbs. of acrylonitrile and 19.59 lbs. of GAP. The initial initiator charge contained 3.23 lbs. of GAP in 11.17 liters of acetone. The continuously added feed solution comprised 16.36 lbs. of GAP in 40.43 liters of acetone. The feed solution was added according to the following schedule:

FEED SCHEDULE

| Time (hrs.) | Rate (l./hr.) | Total feed (l.) |
|---|---|---|
| 0 | 6.22 | 0.00 |
| 1 | 5.37 | 5.78 |
| 2 | 4.70 | 10.80 |
| 3 | 4.14 | 15.21 |
| 4 | 3.68 | 19.11 |
| 5 | 3.28 | 22.59 |
| 6 | 2.95 | 25.70 |
| 7 | 2.67 | 28.51 |
| 8 | 2.42 | 31.05 |
| 9 | 2.21 | 33.36 |
| 10 | 2.02 | 35.47 |
| 11 | 1.85 | 37.40 |
| 12 | 1.71 | 39.18 |
| 12¾ | 1.61 | 40.43 |

59.1 lbs. of polymer were obtained after 12¾ hours at a reaction temperature of 95° C. The polymer had a viscosity at 25° C. of 323 poises and a carboxyl content of 0.0811 equivalent/100 grams.

Although specific embodiments have been shown and described, it is to be understood that they are illustrative and are not to be construed as limiting on the scope and spirit of the invention.

We claim:

1. The method of making a carboxy-terminated polymer of a monomer selected from the group consisting of butadiene, isoprene, a mixture of butadiene and isoprene, a mixture of butadiene with up to 35 percent by weight of a member selected from the group consisting of styrene and acrylonitrile, and a mixture of isoprene with up to 35 percent by weight of a member selected from the group consisting of styrene and acrylonitrile, said polymer having an average molecular weight between about 500 and about 10,000, which method consists essentially of polymerizing said monomer at a temperature from about 60° C. to about 130° C. in the presence of an alkylene dicarboxylic acid peroxide initiator by adding said initiator to said monomer in a variable non-linear fashion to maintain the ratio $M:\sqrt{C}$ at a substantially constant value, where M is the concentration of monomer in the polymerizing mixture, in moles per liter, and C is the concentration of initiator in the polymerizing mixture, in moles per liter.

2. The method as in claim 1 wherein said alkylene dicarboxylic acid peroxide initiator is glutaric acid peroxide.

3. The method as in claim 1 wherein said alkylene dicarboxylic acid peroxide initiator is succinic acid peroxide.

4. The method as in claim 1 wherein said monomer is butadiene.

5. The method as in claim 1 wherein the variable non-linear addition of initiator is continuous during the course of the polymerization.

6. The method as in claim 1 wherein the variable non-linear addition of initiator is discontinuous during the course of the polymerization.

7. The method of making a carboxy-terminated polymer of butadiene, said polymer having an average molecular weight between about 500 and about 10,000, which method consists essentially of polymerizing said butadiene at a temperature from about 75° C. to about 130° C. in the presence of glutaric acid peroxide as an initiator by adding said initiator to said butadiene in a variable non-linear fashion to maintain the ratio $M:\sqrt{C}$ at a substantially constant value between 9.2 and 728, where M is the concentration of butadiene in the polymerizing mixture, in moles per liter, and C is the concentration of initiator in the polymerizing mixture, in moles per liter.

8. The method of making a carboxy-terminated polymer of butadiene, said polymer having an average molecular weight between about 500 and about 10,000, which method consists essentially of polymerizing said butadiene at a temperature from about 75° C. to about 130° C. in the presence of succinic acid peroxide as an initiator by adding said initiator to said butadiene in a variable non-linear fashion to maintain the ratio $M:\sqrt{C}$ at a substantially constant value between 6.0 and 390, where M is the concentration of butadiene in the polymerizing mixture, in moles per liter, and C is the concentration of initiator in the polymerizing mixture, in moles per liter.

9. A polymer of a monomer selected from the group consisting of butadiene, isoprene, a mixture of butadiene and isoprene, a mixture of butadiene with up to 35 percent by weight of a member selected from the group consisting of styrene and acrylonitrile, and a mixture of isoprene with up to 35 percent by weight of a member selected from the group consisting of styrene and acrylonitrile, said polymer having an average molecular weight between about 500 and about 1000 and a narrow molecular weight distribution such that at least 60 percent of the product has a molecular weight within ±33⅓ percent of the average molecular weight, said polymer further having a viscosity between about 50 to about 2,000 poises, the molecules of said polymer being substantially all terminated by carboxyl terminals about 70 percent of which are joined by a hydrocarbon chain to the balance of the polymer.

10. A polymer as in claim 9 wherein said polymer is a polymer of butadiene.

References Cited by the Examiner

UNITED STATES PATENTS

| | | | |
|---|---|---|---|
| 2,434,536 | 1/1948 | Arundale | 260—82.7 |
| 2,471,959 | 5/1949 | Hunt | 210—89.5 |
| 2,559,630 | 7/1951 | Bullitt | 260—94.2 |
| 3,083,191 | 3/1963 | Uranek et al. | 260—94.7 |

FOREIGN PATENTS 822,840  11/1959  Great Britain.

OTHER REFERENCES

Hawkins, Organic Peroxides, E. and F. N. Spon Ltd., London (1961) (pp. 300 to 304).

LORRAINE A. WEINBERGER, *Primary Examiner.*

CHARLES B. PARKER, LEON ZITVER, *Examiners.*